US011588717B2

(12) United States Patent
Cheh et al.

(10) Patent No.: US 11,588,717 B2
(45) Date of Patent: *Feb. 21, 2023

(54) TROUBLESHOOTING MULTI-LAYERED NETWORKS USING DATAPATH ANALYSIS

(71) Applicant: International Business Machines Corporation, Armonk, NY (US)

(72) Inventors: Raymond Wing Chon Cheh, Sunnyvale, CA (US); Ivan Dean Bogdanovic, Brookline, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,219

(22) Filed: Mar. 9, 2020

(65) Prior Publication Data

US 2021/0036941 A1 Feb. 4, 2021

Related U.S. Application Data

(63) Continuation of application No. 15/600,411, filed on May 19, 2017, now Pat. No. 10,608,912.
(Continued)

(51) Int. Cl.
*H04L 43/0829* (2022.01)
*H04L 41/0631* (2022.01)
(Continued)

(52) U.S. Cl.
CPC ...... *H04L 43/0829* (2013.01); *H04L 41/0645* (2013.01); *H04L 41/0668* (2013.01);
(Continued)

(58) Field of Classification Search
CPC ............................ H04L 43/0829; H04L 12/26
See application file for complete search history.

(56) References Cited

U.S. PATENT DOCUMENTS 8,619,599 B1 * 12/2013 Even .................. H04L 43/50
370/249
9,038,151 B1 * 5/2015 Chua .................. H04L 63/0209
726/1
(Continued)

OTHER PUBLICATIONS

International Search Report and Written Opinion for International Application No. PCT/US2017/033768, dated Aug. 24, 2016.
(Continued)

*Primary Examiner* — Khanh Q Dinh
(74) *Attorney, Agent, or Firm* — Garg Law Firm, PLLC; Rakesh Garg; Michael O'Keefe

(57) ABSTRACT

In various embodiments, the techniques and supporting systems implement a recursive routing mechanism in hierarchical topological addressed environments to analyze and determine the presence of packet-forwarding errors within an IP network comprising a plurality of network-connected devices. This includes receiving, at a software defined network device, an indication of a potential packet-forwarding error between a first and second device of the plurality of network-connected devices and injecting, by the software defined network device, a test packet at an ingress to the first device. The test packet includes an initial ingress interface location identifying the first device, an alternate ingress interface location identifying the software defined network device and an egress interface location identifying the second device. A determination may then be made as to whether the test packet is received at the second device, thus indicating the existence or lack of routing errors.

20 Claims, 6 Drawing Sheets

Related U.S. Application Data

(60) Provisional application No. 62/339,187, filed on May 20, 2016.

(51) Int. Cl.

| | |
|---|---|
| *H04L 43/10* | (2022.01) |
| *H04L 41/0677* | (2022.01) |
| *H04L 9/40* | (2022.01) |
| *H04L 41/0668* | (2022.01) |
| *H04L 41/147* | (2022.01) |
| H04L 43/091 | (2022.01) |
| H04L 41/0213 | (2022.01) |
| H04L 41/0823 | (2022.01) |
| H04L 41/12 | (2022.01) |
| H04L 43/022 | (2022.01) |
| H04L 43/0805 | (2022.01) |
| H04L 43/0811 | (2022.01) |
| H04L 69/22 | (2022.01) |
| H04M 3/22 | (2006.01) |

(52) U.S. Cl.
CPC ........ *H04L 41/0677* (2013.01); *H04L 41/147* (2013.01); *H04L 43/10* (2013.01); *H04L 63/0272* (2013.01); *H04L 63/123* (2013.01); *H04L 41/0213* (2013.01); *H04L 41/0836* (2013.01); *H04L 41/12* (2013.01); *H04L 43/022* (2013.01); *H04L 43/0805* (2013.01); *H04L 43/0811* (2013.01); *H04L 43/091* (2022.05); *H04L 63/164* (2013.01); *H04L 69/22* (2013.01); *H04M 3/2254* (2013.01)

(56) References Cited

U.S. PATENT DOCUMENTS

| | | | |
|---|---|---|---|
| 9,178,807 B1 * | 11/2015 | Chua | H04L 45/02 |
| 9,264,301 B1 * | 2/2016 | Chua | H04L 63/02 |
| 9,276,877 B1 * | 3/2016 | Chua | H04L 45/00 |
| 10,608,912 B2 * | 3/2020 | Cheh | H04L 41/0645 |
| 2004/0095893 A1 | 5/2004 | Goringe et al. | |
| 2012/0106339 A1 | 5/2012 | Mishra et al. | |
| 2012/0106358 A1 * | 5/2012 | Mishra | H04L 43/00 370/242 |
| 2012/0147742 A1 | 6/2012 | Kitamori et al. | |
| 2013/0100824 A1 | 4/2013 | Cao et al. | |
| 2014/0169158 A1 * | 6/2014 | Mishra | H04L 49/3009 370/228 |
| 2015/0023210 A1 | 1/2015 | Kis | |
| 2015/0163152 A1 | 6/2015 | Li | |
| 2016/0352665 A1 | 12/2016 | Nielsen et al. | |
| 2017/0180153 A1 * | 6/2017 | Subramaniam | H04L 49/354 |
| 2017/0339037 A1 * | 11/2017 | Cheh | H04L 63/123 |
| 2019/0177217 A1 * | 6/2019 | Alavi | D04H 1/587 |

OTHER PUBLICATIONS

European Search Report for International Application No. PCT/US2017/033768, dated Dec. 2, 2019 (6 pages).
U.S. Appl. No. 15/600,411, filed May 19, 2017, Cheh et al..
Application No. 2020-193061, Receive Rejection, dated Jan. 24, 2022.
Application No. 2020-193061, Receive Rejection English Translation, dated Jan. 24, 2022.

* cited by examiner

TROUBLESHOOTING MULTI-LAYERED NETWORKS USING DATAPATH ANALYSIS

CROSS-REFERENCE TO RELATED APPLICATIONS

This application is a continuation of U.S. patent application Ser. No. 15/600,411, entitled "Troubleshooting Multi-Layered Networks Using Datapath Analysis" filed on May 19, 2017, which claims priority to and the benefit of U.S. Provisional Patent Application Ser. No. 62/339,187, entitled "Troubleshooting Multi-Layered Networks Using Datapath Analysis" filed on May 20, 2016, each of which is hereby incorporated by reference herein in its entirety.

FIELD OF THE INVENTION

The invention relates generally to techniques for improving network routing, more specifically, for using datapath analysis to troubleshoot MPLS-based networks.

BACKGROUND

In today's data networking, the general goal is to send data traffic from a host machine to another machine via some combination of network elements (e.g., routers, switches, etc.). The route the traffic follows when forwarded between two host machines is referred to as a "datapath." Unless the two hosts are directly connected, some set of Control-plane Protocols (for instance, OSPF, ISIS, MPLS RSVP or MPLS LDP) are used among the network elements to understand the connectivity among the network elements and to construct the datapaths for a host in one network subnet (100) to communicate with intermediate network elements (104a-104n, and generally 104) and hosts in other network subnets (108). FIG. 1 generally illustrates the arrangement of these elements.

Each network element forwards the data transmitted from a previous device using different criteria determined by the Control-Protocol for that datapath onto the next network segment, where a network segment is the connection between any two devices, either between a host and its connected network element, or between two directly connected network elements. For example, a network element may determine how to forward a data packet by examining the Layer 2, Layer 3 or MPLS header of the incoming data packet, and either encapsulate the data packet into a different data-format, decapsulate the data packet by removing the outer header of the data packet, or simply forward the data packet without changing the data packet header format.

FIG. 2 generally illustrates the datapath of a Multi-Protocol Label Switching (MPLS) network that facilitates a Layer Three Virtual Private Network (L3VPN) for encrypted, private communications. This technology transmits data packets over MPLS Label Switched Paths (LSPs) tunnels and packet forwarding is managed at the network layer (OSI Layer 3) based on knowledge of neighboring nodes in the network and other network characteristics. L3VPN network elements consist of customer edge nodes (CE) (usually a router) 204a and 204b located at a customer's premise that provides an interface between the customer's internal local network and the internet service provider's core network, provider edge nodes (PEs) 208a and 208b which interface between the CE nodes and service providers, and the provider nodes (P) 212 which make up the provider's network.

In the case of a L3VPN, the two end points are the two host machines 100. A CE router forwards the IP data packets sent by the connected host 100 to the remote CE router via the directly connected PE router. The PE router encapsulates each IP data packet using two MPLS labels and forwards the MPLS encapsulated IP data packets to the remote PE router (which is the remote end-point of the MPLS "tunnel") via one or more P nodes. The P nodes forward the MPLS encapsulated IP data packets by examining and swapping the outer (and not the inner) MPLS label towards the remote PE router. When the remote PE router receives the MPLS encapsulated IP data packet, it removes the MPLS header (and hence restoring the data packets to its original IP format) and forwards it to the destination CE router, which in turn, forwards the IP data packets to its connected host. FIG. 3 illustrates and example of IP traffic forwarding with firewall filtering implemented.

In this example, Router3 operates as the gateway connecting the internal network (Router1 and Router2) to the public Internet. Router3 communicates with Router1 and Router2 and all other internal routers using OSPF, whereas Router3 communicates with Router4 using BGP. Router4 connects to the rest of the Internet. Router3 is configured with a firewall feature to discard unintended user data between the internal network and the Internet.

Both of these examples illustrate the datapaths being set up with more than one Control-Plane Protocols. In the IP traffic forwarding with Firewall Filtering case, the Firewall is a service chained inline to the datapath as well.

SUMMARY OF THE INVENTION

In various embodiments, the techniques and supporting systems described herein overcome the aforementioned problems by implementing a recursive routing mechanism in hierarchical topological addressed environments, which address mobility issues, as well as the routing table sizes that can be implemented on the network elements at one of the two ends, as well as on any of the intermediate network elements.

In a first aspect, a method of determining the presence of packet-forwarding errors within an IP network comprising a plurality of network-connected devices includes receiving, at a software defined network device, an indication of a potential packet-forwarding error between a first and second device of the plurality of network-connected devices and injecting, by the software defined network device, a test packet at an ingress to the first device. The test packet includes an initial ingress interface location identifying the first device, an alternate ingress interface location identifying the software defined network device and an egress interface location identifying the second device. A determination may then be made as to whether the test packet is received at the second device.

In some embodiments, the data is transmitted through a virtual private network, which may include using multiprotocol label switching among devices such as routers, and there may be multiple devices sitting along the datapath between the first and second device. In certain cases, control-plane functions are provided by the software defined network device and forwarding-plane functions are provided by the plurality of network devices. The software defined network device may query the second network element to determine if the test packet is received there, to confirm there are no routing issues along the datapath. The query may result in the extraction of the test packet from the datapath either before or at the second network element.

In another aspect, the invention provides a system for determining the presence of packet-forwarding errors within an IP network comprising a plurality of network-connected devices. The system includes at least one memory unit for storing computer-executable instructions and at least one processing unit for executing the instructions stored in the memory, wherein execution of the instructions results in an instantiation of a virtual software network device controller. When the controller is instantiated, it receives an indication of a potential packet-forwarding error between a first and second device of the plurality of network-connected devices and injects a test packet at an ingress to the first device, the test packet comprising an initial ingress interface location identifying the first device, an alternate ingress interface location identifying the software defined network device and an egress interface location identifying the second device. The controller can then determine if the test packet is received at the second device.

In some embodiments of the system, the data is transmitted through a virtual private network, which may include using multiprotocol label switching among devices such as routers, and there may be multiple devices sitting along the datapath between the first and second device. In certain cases, control-plane functions are provided by the virtual software network device controller and forwarding-plane functions are provided by the plurality of network devices. The virtual software network device controller may query the second network element to determine if the test packet is received there, to confirm there are no routing issues along the datapath. The query may result in the extraction of the test packet from the datapath either before or at the second network element.

BRIEF DESCRIPTION OF FIGURES

In the drawings, like reference characters generally refer to the same parts throughout the different views. Also, the drawings are not necessarily to scale, emphasis instead generally being placed upon illustrating the principles of the invention.

DETAILS OF THE INVENTION

Figure 1:
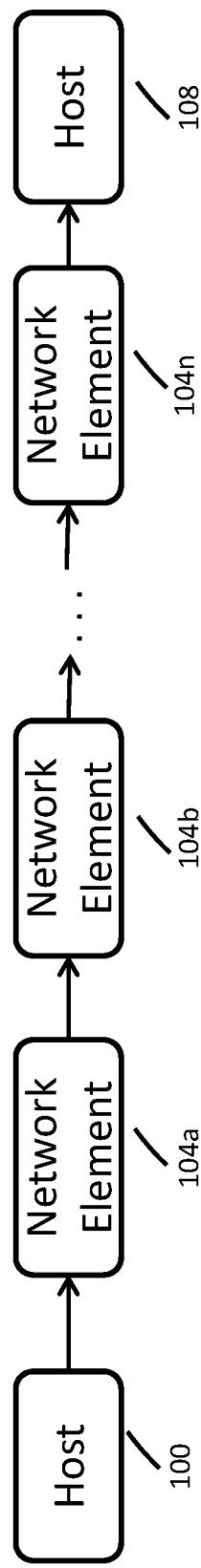
FIGS. 1-3 illustrate various background information generally related to the field in which the invention may be implemented and operates.
Figure 2:
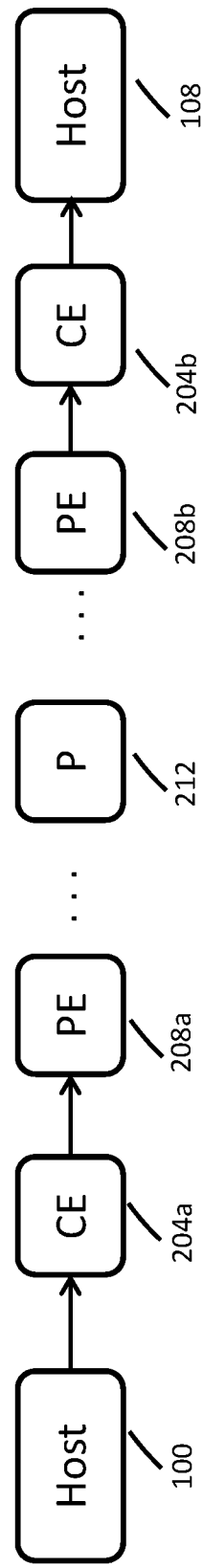

Embodiments of the invention utilize techniques and principles of an software-defined network ("SDN") to facilitate datapath troubleshooting. Using the knowledge of a SDN controller on the network elements along the datapath, the SDN controller can:
 inject test-packets in the appropriate data packet format, onto any network elements along the datapath;
 examine any problems of the traversal of the test-packets along the datapath by querying any network elements along the datapath; and
 withdraw the test-packets at any point along the datapath.

Traditionally, to troubleshoot a datapath, operators send ping packets between the two endpoints to verify the end-to-end connectivity. In the L3VPN case, the ping packet is sent from a CE router to the remote CE router (so that the ping (ICMP over IP) packet will follow the normal datapath of the L3VPN traffic data.

This ping packet is forwarded from the CE router to the PE router as an IP packet; encapsulated on the PE router in an MPLS frame and forwarded to the connecting P router, the P router MPLS label-switches it towards the remote PE router by examining the combination of the ingress interface and the MPLS label. When the packet reaches the remote PE router, it is decapsulated and forwarded to the remote CE router in the IP packet format.

In traditional networking, if there are problems with this data-forwarding path between the two PE routers, a test packet in the correct format cannot be easily injected into the datapath (Network operators can log on to the PE or P router but most routers only have the capability to originate ICMP/IP ping packets, not all routers have the ability to ping or trace an MPLS LSP path, and pinging using specific MPLS labels is almost unheard of). For example, if the test packet is an IP or ping packet being injected into the datapath at the PE or P router, the PE or P router will only examine the packet's IP header (destination IP address) rather than looking at the MPLS label (which the IP packet does not have) to determine the forwarding node. Hence, this IP test packet will not follow the MPLS switched-path in the L3VPN datapath towards the remote PE router or the remote CE router—the IP test packet is not the correct format for troubleshooting this datapath. Injecting an MPLS frame on the PE or P router requires disconnecting the ingress interface to connect to the traffic generator so that the test packet can emanate from the particular ingress interface, which can cause a disruption in the L3VPN traffic. Disconnecting the original network connection to connect it to the traffic generator is necessary because the PE or P router will look at the combination of the ingress interface and the outer MPLS label to determine how to follow the datapath, and the injection of the test packet requires the traffic generator connecting to the router ingress interface to generate a test packet with a specific MPLS header.

Another difficulty with the traditional implementation of network devices is that the data-forwarding plane is tightly coupled with the control-plane. In specifics, it is not easy to modify the forwarding-path:
 {intf1 is ingress, label1}--action-→{intf2 is egress, label2}
In order to not have to break the connection on the ingress-interface, an alternative method is to add to this forwarding-path:
 {intf1 or intf3 is ingress, label1}-action→{intf2 is egress, label2}

Without the use of an SDN as described herein, both the control-plane processing and the forwarding-plane processing would be co-resident on the network element. Each control-plane process on a network element (for example, the routing process handling routing protocols such as OSPF, ISIS or BGP, or the Ethernet switching process handling the L2 switching protocols such as STP) are responsible for communicating with the same feature components on other network elements in the same network to decide how the user traffic is forwarded in the network. As such, the implementation of a particular policy governing the manipulation of data traffic arriving on each network interface device (e.g., forwarding with or without the data packet header changes, or encapsulation or decapsulation), and on which interface should the modified data packet should be sent out is applied at the control-plane. Therefore, traditional network troubleshooting is addressed from the control-plane point-of-view, and includes very limited datapath troubleshooting, if any.

In the above L3VPN example, the L3VPN datapath is determined and set up by a combination of BGP and IGP (OSPF or ISIS) and an MPLS protocol among the two PE routers and the P routers (and, in some cases, routers not involved in forwarding the user data traffic), with a different routing protocol being communicated between the CE router and the PE routers. Route-filtering may be implemented on any or all of the CE or PE routers.

Figure 3:
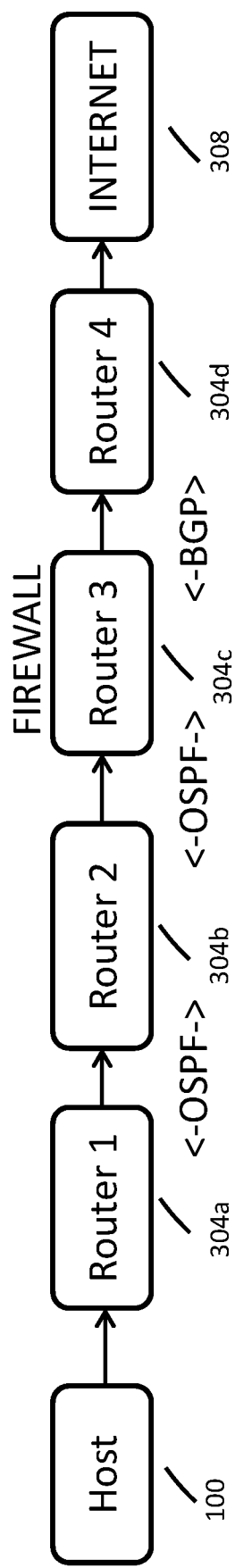

Conventional mechanisms used to troubleshoot the Control-Plane aspect of these components address, for example, how each of the network element communicates the Control-Plane protocols with other Network Elements in the network, which in turn defines the data-path. For the IP Forwarding with Firewall Filtering example illustrated in FIG. 3, traditional control-plane troubleshooting involves reviewing OSPF information on the internal routers (Router1, Router2 and other internal routers) and Router3, and BGP information between Router3 and Router4. The operator will typically also review the firewall feature on Router3.

To troubleshoot some service problems (for example a video application) using the datapath, operators traditionally rely on conventional ping (ICMP) from the internal host to test connectivity between the internal host and the Internet host. This may fail if the firewall filters ICMP packets but allows video packets to pass, if the firewall allows ICMP packets to pass but filters video packets, or if the internet host does not respond to ping requests. Only a packet in an appropriate format (in this case, in the video packet format) can reliably troubleshoot the service problems due to the network.

In various embodiments, the techniques and supporting systems described herein overcome these problems by implementing a recursive routing mechanism in hierarchical topological addressed environments, which address mobility issues, as well as the routing table sizes that can be implemented on the network elements at one of the two ends, as well as on any of the intermediate network elements.

The control-plane is the part of a network that carries signaling traffic and is responsible for routing, system configuration and management. The data forwarding-plane (sometimes known as the user plane, data plane, carrier plane, or bearer plane) is the part of a network that carries user traffic. In conventional network element designs, the forwarding-plane is controlled by the control-plane element on the network element and there is no way to manipulate or modify the data-forwarding plane externally. On the control-plane level, MPLS label-switching is implemented as a one-to-one mapping (unicast) or one-to-many mapping (multicast) but not many-to-one mapping.

In various embodiments of the invention, the control-plane and the forwarding-plane processing elements are separated such that the control-plane operations are implemented on an SDN (e.g., virtual) controller which are mapped to the forwarding-plane operating on the network element. Thus, the invention facilitates the addition of many-to-one mapping functionality on the data-forwarding plane without impacting the control-plane.

As a result, the forwarding path can be represented as:
{intf1 or SDN control intf is ingress, label1}-
action→{intf2 is egress, label2}

Using this approach, the SDN controller can send the test packet onto a device and let it follow the datapath in doubt for troubleshooting. Once the test packet is switched from the SDN control intf with label1 to the egress intf2 with label2, the test packet will follow the datapath in question.

This technique can be used on any of the network elements along the datapath. Since the SDN controller (the entity responsible for injecting the test packet) is responsible for all the devices along the datapath, it knows exactly the packet format needed for insertion into the datapath at any point. For the same reason, if the SDN controller needs to get information about the test packet anywhere along the datapath (e.g., while in transit before it reaches the destination), the SDN controller can retrieve such information from any of the network elements along the datapath.

The inventive approach facilitates troubleshooting by allowing test-packet injection onto any component along the datapath. The SDN controller determines the packet format needed because the SDN controller knows the specific Control-Plane Protocols used to determine the datapath, and the traffic data format used on any network segments.

Figure 4:
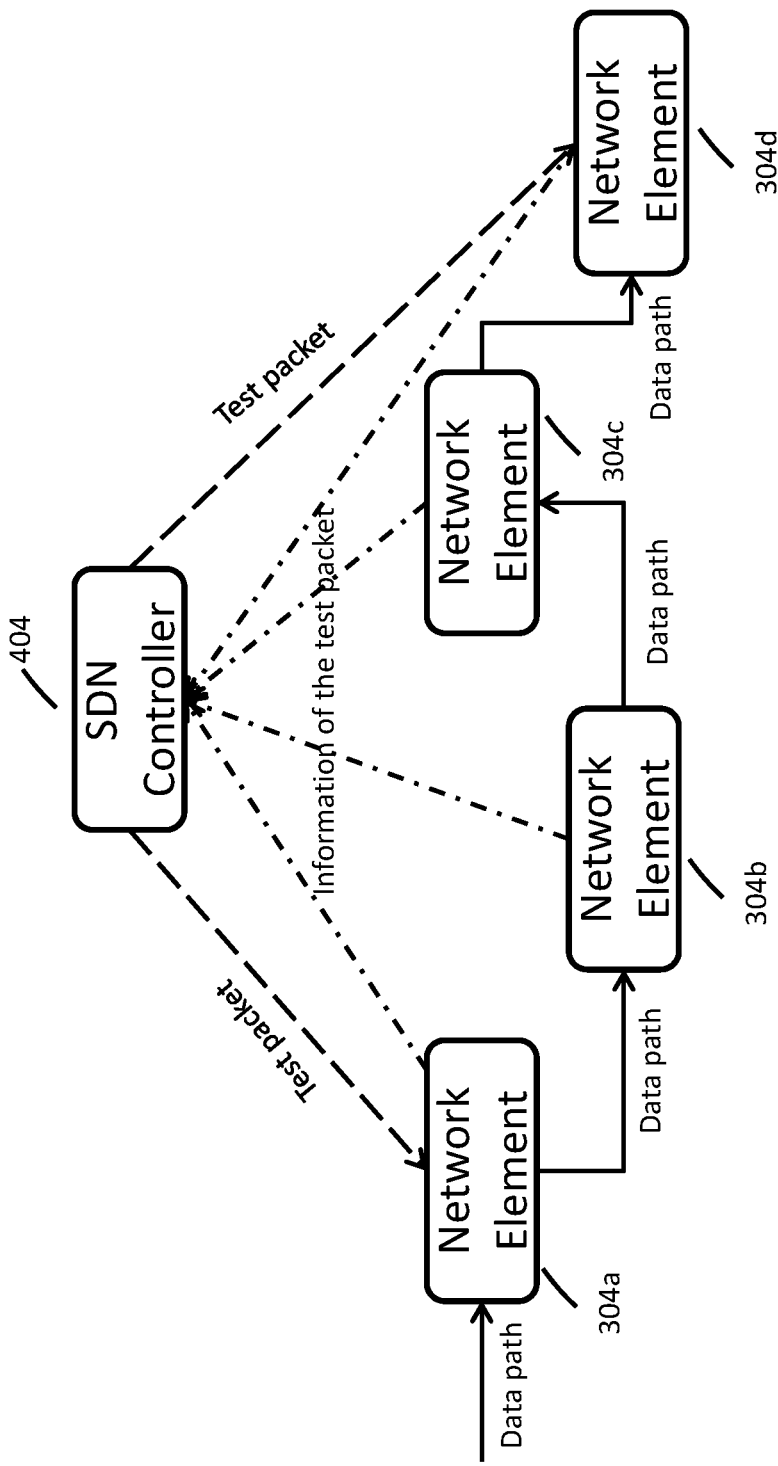
FIG. 4 illustrates the use of test packets used to troubleshoot networks in accordance with various embodiments of the invention.

In a L3VPN example organized as illustrated in FIG. 4 the SDN controller 404 controls all the routers (304a-304d) for the datapath between CE1 and CE2, and it knows the role of each of the network element, and that CE1 will send IP packets from CE1 to CE2 via PE1. When PE1 receives the packets sent (source IP address) from CE1 or a host in the Internal Network behind CE1, it will be an IP packet destined to CE2 or a host in the Internal Network behind CE2. To test this datapath, the SDN controller generates an IP packet onto PE1 with source IP Address of CE1 or a host from the Internal Network behind CE1 and destination IP Address of CE2 or a host from the internal network behind CE2 and, in some instances, test data payload for test packet identification.

Figure 5:
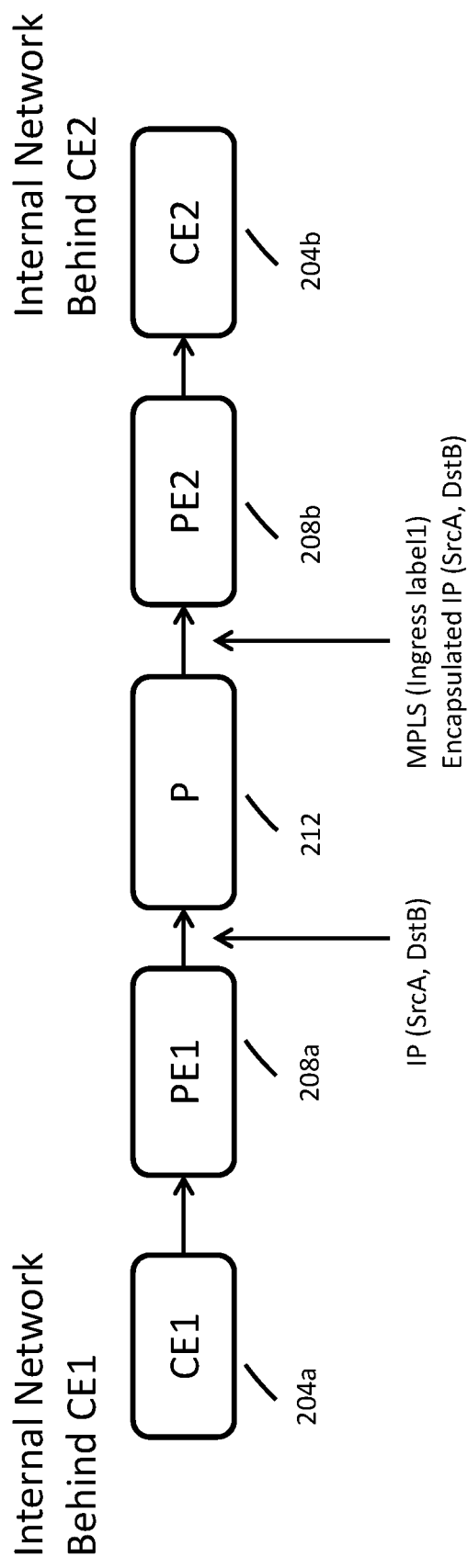
FIG. 5 illustrates the use of intervening data packet analyses in which the invention may be implemented and operates.

If the datapath forwarding problem is suspected to be between P and CE2, the SDN controller 404 generates an MPLS packet onto router P with the MPLS label expected on the ingress interface on P encapsulating the aforementioned IP packet, as illustrated in FIG. 5, where SrcA is the IP address of CE1 or a host in the Internal Network behind CE1, DstB is the IP address of CE2 or a host in the Internal Network behind CE2 (the destination node) and Label1 is an MPLS label expected to be received on the ingress interface on router P. In this use case, the test packet can traverse PE2 router and then the CE2 router which is beyond a single component.

The disclosed approach, however, can be extended to network unit-testing by checking the egress MPLS-encapsulated-IP packet on the egress interface on the P router after sending the MPLS-encapsulated-IP packet ingressing on that P router (e.g., testing the processing on the P-router).

Figure 6:
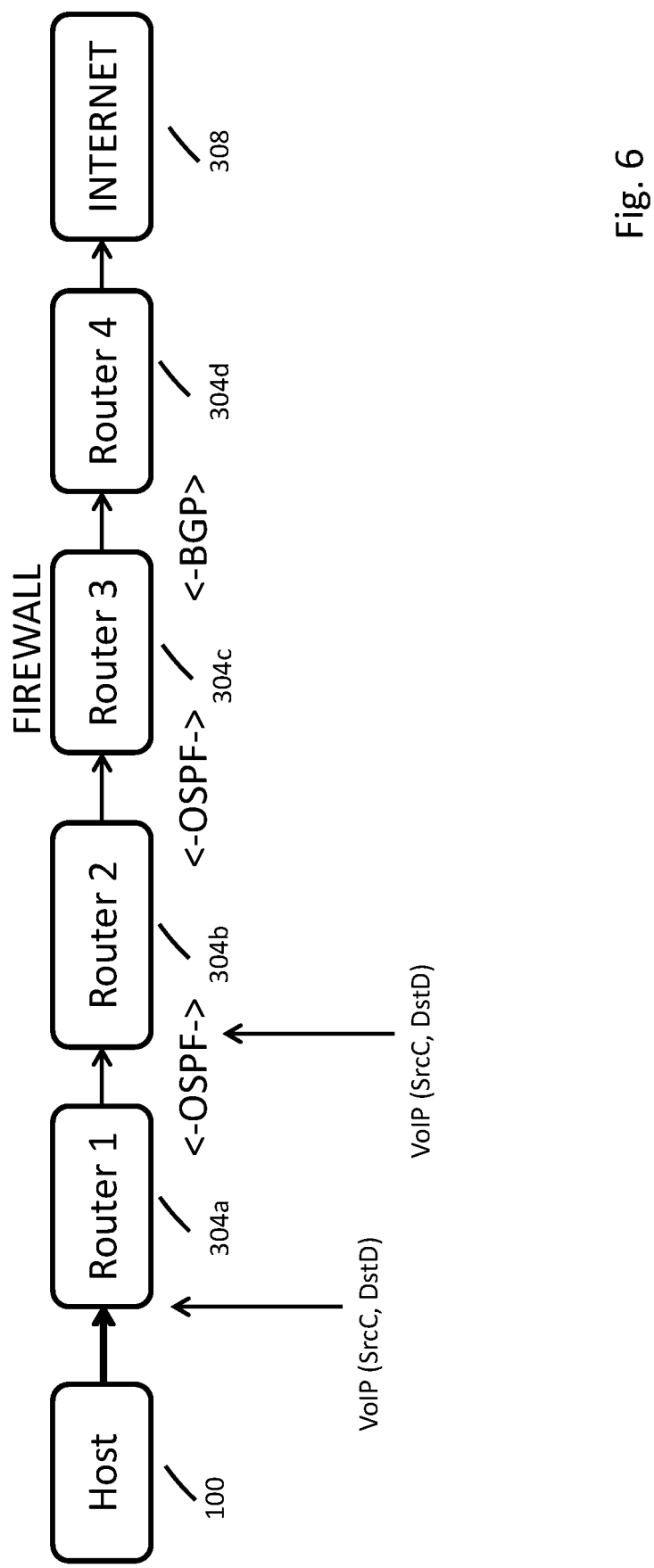
FIG. 6 illustrates and additional exemplary use of intervening data packet analyses in which the invention may be implemented and operates.

In the example in which a firewall is being used, the path may be illustrated shown in FIG. 6. To troubleshoot the video packets forwarding from Router1 to the Internet, for example, the test packet can be generated in the video packet format using IP Source Address SrcC and IP Destination address DstD, where SrcC is the IP address of the host packet before Router1, and DstD is the IP address of the host packet in the Internet.

If for example data disruption is suspected on Router3, the test packet can be injected anywhere before Router3 or before the packet is being processed on Router3. If Router4 receives the test packet, Router3 forwarding and firewall filtering function on the IP encapsulated Voice format is confirmed.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or other non-transitory storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The techniques and system architecture described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of determining the presence of packet-forwarding errors within an IP network comprising a plurality of network-connected devices, the method comprising:
   receiving, at a software defined network device, an indication of a potential packet-forwarding error between a first and second device of the plurality of network-connected devices;
   injecting, by the software defined network device, a test packet at an ingress to the first device, the test packet comprising an initial ingress interface location information identifying the first device, an alternate ingress interface location information identifying the software defined network device and an egress interface location information identifying the second device; and
   determining, by the software defined network device if the test packet is received at the second device.

2. The method of claim 1 wherein data packets are transmitted among the plurality of network-connected devices using multiprotocol label switching.

3. The method of claim 2 wherein the data packets are transmitted among the plurality of network-connected devices using a virtual private network.

4. The method of claim 1 wherein at least one of the network-connected devices comprises a router.

5. The method of claim 1 wherein control-plane functions are provided by the software defined network device and forwarding-plane functions are provided by the plurality of network devices.

6. The method of claim 1 wherein determining if the test packet is received by at the second device comprises querying the second network element.

7. The method of claim 6 further comprising extracting, by the software network device, the test packet from its data path.

8. The method of claim 7 wherein the data packet is extracted prior to reaching the second network device.

9. The method of claim 7 wherein the data packet is extracted from the second network device.

10. The method of claim 1 wherein one or more additional network devices sit along a data path between the first network device and the second network device.

11. A system for determining the presence of packet-forwarding errors within an IP network comprising a plurality of network-connected devices, the system comprising:
    at least one memory unit for storing computer-executable instructions; and at least one processing unit for executing the instructions stored in the memory, wherein execution of the instructions results in an instantiation of a virtual software network device controller, which when instantiated:

receives an indication of a potential packet-forwarding error between a first and second device of the plurality of network-connected devices;

injects a test packet at an ingress to the first device, the test packet comprising an initial ingress interface location information identifying the first device, an alternate ingress interface location information identifying the software defined network device and an egress interface location information identifying the second device; and determines if the test packet is received at the second device.

12. The system of claim 11 wherein data packets are transmitted among the plurality of network-connected devices using multiprotocol label switching.

13. The system of claim 12 wherein the data packets are transmitted among the plurality of network-connected devices using a virtual private network.

14. The system of claim 11 wherein at least one of the network-connected devices comprises a router.

15. The system of claim 11 wherein the virtual software network device controller provides control-plane functions and forwarding-plane functions are provided by the plurality of network devices.

16. The system of claim 11 wherein the virtual software network device controller queries the second network element to determine if the test packet is received by at the second device.

17. The system of claim 16 wherein the virtual software network device controller extracts the test packet from its data path.

18. The system of claim 17 wherein the data packet is extracted prior to reaching the second network device.

19. The system of claim 17 wherein the data packet is extracted from the second network device.

20. The system of claim 11 wherein one or more additional network devices sit along a data path between the first network device and the second network device.

* * * * *